United States Patent
Kumpf et al.

(12)

(10) Patent No.: US 6,289,371 B1
(45) Date of Patent: Sep. 11, 2001

(54) NETWORK SCAN SERVER SUPPORT METHOD USING A WEB BROWSER

(75) Inventors: David A. Kumpf, Rocklin; David W. McAnaney, Vacaville; Daniel R. Pearson, Roseville, all of CA (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/163,791

(22) Filed: Sep. 30, 1998

(51) Int. Cl.[7] ....................................... G06F 15/16
(52) U.S. Cl. ............................. 709/203; 709/217
(58) Field of Search ................................ 709/203, 217, 709/218, 219; 710/8, 3, 10, 19

(56) References Cited

U.S. PATENT DOCUMENTS

| | | | |
|---|---|---|---|
| 5,913,088 | * 6/1999 | Moghadam et al. | 396/311 |
| 5,933,580 | * 8/1999 | Uda et al. | 395/112 |
| 5,946,458 | * 8/1999 | Austin et al. | 395/114 |
| 6,020,973 | * 2/2000 | Levine et al. | 358/1.15 |
| 6,101,555 | * 8/2000 | Goshey et al. | 709/301 |

* cited by examiner

Primary Examiner—Mehmet B. Geckil (57) ABSTRACT

An interactive networked client-server scan method launched and actively managed through a web browser interface on a client. A server of the method responds to a universal resource locator address identifying the server with a general purpose format software program that creates an interface in the client web browser and enables the client to interact with the server in initiating, altering and monitoring scan jobs and related data. The server preferably provides peripheral status information to the web browser, and enables the client to initiate preview scans while providing progress updates concerning such scans to the client. Parameter selection and alteration is also a preferred functionality enabled for selection and alteration in the client interface through the general purpose software program provided by the server. The server translates and formats data for the client, and also preferably performs an on-the-fly gamma correction of color data to data prior to transmitting it to the client. Other preferred features include multipage scanning and image scan area selection.

22 Claims, 10 Drawing Sheets

NETWORK SCAN SERVER SUPPORT METHOD USING A WEB BROWSER

The present invention generally relates to scan control network software and firmware, i.e., software embedded on a system. More particularly, the present invention concerns software and firmware for interactive server-client support of peripherals including scan functions over a network with a web browser.

Scanning peripherals are becoming a larger segment of the peripheral industry. Users find such peripherals usefull as a means of input for text, graphics and images. Many software applications now permit manipulation and use of such data. Some peripherals combine scanning with other functions. These multifunction peripherals are popular, in part, because of their ability to combine multiple useful functions into a single device. Multifunction and scanning peripheral vendors typically provide custom software that takes advantage of features of the peripheral. Usually, however, the custom software is written to communicate only with a single device over a local interface, such as a SCSI bus or a parallel port. While such known local interface designs are simple, they fail to address issues that occur when the peripheral is attached to a network.

A problem exists for such peripheral use over a local interface because the custom software for the peripheral must be developed and tested to run on various computer operating systems such as WINDOWS®, WINDOWS NT®, MACINTOSH®, and UNIX®. Problems are multiplied on a network because software must be adapted to communicate with the device over the network using the device's unique control language. To accomplish scanning, for example, an end-user or a network administrator will have to install special software on each client that wishes to scan from the network peripheral.

Another problem with sharing a peripheral on a network is contention. Contention occurs when multiple users attempt to access the same device simultaneously. For example, two users may try to initiate a scan from their client personal computers (PC) to the same network peripheral. Contention occurs since the peripheral can only handle one scan request at a time. Additionally, contention develops when one user attempts to initiate a scan while another user is using the device as a printer or a walk-up copier. Contention can also occur when another user attempts to initiate a new scan between the pages of a multi-scan job.

Additional problems arise with existing scan servers that cannot dynamically detect and automatically display changes in the peripheral status as to user availability and use. Further, existing scan servers provide no ability for a client to preview and crop an image to scan only a region of interest. Similarly, there is no progress feedback provided from the server to the client as the scan progresses, leaving the client dependent upon its own progress update functionality which works only when the client has knowledge concerning the size of the scan job. These drawbacks are especially apparent in known methods for using a web browser to initiate a scan over a network, since such conventional methods provide no dynamic interaction between a client and a server. Instead, the web browser is only able to address the peripheral and receive the scan results. Thus, even conventional scan servers which can be accessed via a web browser over a network to avoid the need for special purpose software on each client could benefit from improvements including greater interaction between client and server, and greater functionality provided from the server to the client.

Accordingly, it is an object of the present invention to provide an improved network scan server method which addresses a scan server through a web browser and which creates dynamic interaction between client and server through a general purpose software program sent from the server to the client to provide improved scan control via a web browser over a network.

It is a further object of the present invention to provide such a method in which a server detects and provides information to the client so that the client may display changes in a peripheral's status in a web browser interface.

Another object of the present invention is to provide such an improved method which permits a client to communicate with a server through a web browser interface and control a scan job to preview and select a desired portion of a previewed scanned image for a final scan.

Still another object of the present invention is to provide such an improved method which can supply progress feedback from the server to the client as a preview scan progresses.

Yet another object of the present invention is to provide such an improved method which can run on various operating systems.

Another object of the present invention is to provide such an improved method which can handle multi page scans and contention problems which exist on the network.

SUMMARY OF THE INVENTION

The present invention provides an interactive networked client-server scan method launched and actively managed through a web browser interface on a client. A server of the method responds to a universal resource locator address identifying the server with a general purpose format software program that creates an interface in the client web browser and enables the client to interact with the server in initiating, altering and monitoring scan jobs and related data.

In a preferred embodiment of the invention, a server responds to a client scan request by sending the client a Java applet that runs in a Java Virtual Machine of the client web browser and permits client-server interactive scan control through user input to the web page. Parameter selection and alteration is also a preferred functionality enabled for selection and alteration in the client interface through the Java applet provided by the server. The server translates and formats data for the client, and also preferably performs an on-the-fly gamma correction to data prior to transmitting it to the client. Other preferred features include multipage scanning, preview and image area selection.

BRIEF DESCRIPTION OF THE DRAWINGS

Other objects, features and advantages will become apparent upon reading the following detailed description, in conjunction with the attached drawings, in which:

FIG. 6 is a table displaying a preferred set of gamma correction values.

TABLE OF ACRONYMS

This patent utilizes several acronyms. The following table is provided to aid the reader in determining the meaning of the several acronyms:

ADF=automatic document feeder.
CPU=central processing unit.
dpi=dots per inch.
HTML=hypertext mark-up language.
HTTP=hypertext transfer protocol.
ID=identification.
IFD=image file directory.
MFPDTF=multifunction peripheral data transfer format.
MIB=management information base.
PC=personal computer.
RAM=random access memory.
SCL=scanner control language.
SNMP=simple network management protocol.
TIFF=tagged image file format.
URL=universal resource locator.

DETAILED DESCRIPTION

Broadly stated, the present invention is directed to a method realized through software, firmware, and hardware which uses a web browser to support scan peripherals over a network and which creates an interactive server-client scan relationship by providing the client with a general purpose software program permitting communication between the server and client to initiate and control actions of a server scan job program and provide user displays through the client.

The present method preferably utilizes JAVA® applets which are small applications written in the JAVA® language. The JAVA® applets run on a JAVA® Virtual Machine which exists as part of a general purpose web browser like NETSCAPE NAVIGATOR® or MICROSOFT INTERNET EXPLORER®. Since the web browser is written to run on most operating systems, including WINDOWS®, WINDOWS NT®, MACINTOSH®, and UNIX®, the JAVA® applet can run on the various operating systems without a need to produce and test different compiled versions of the applet for each system.

Figure 1:
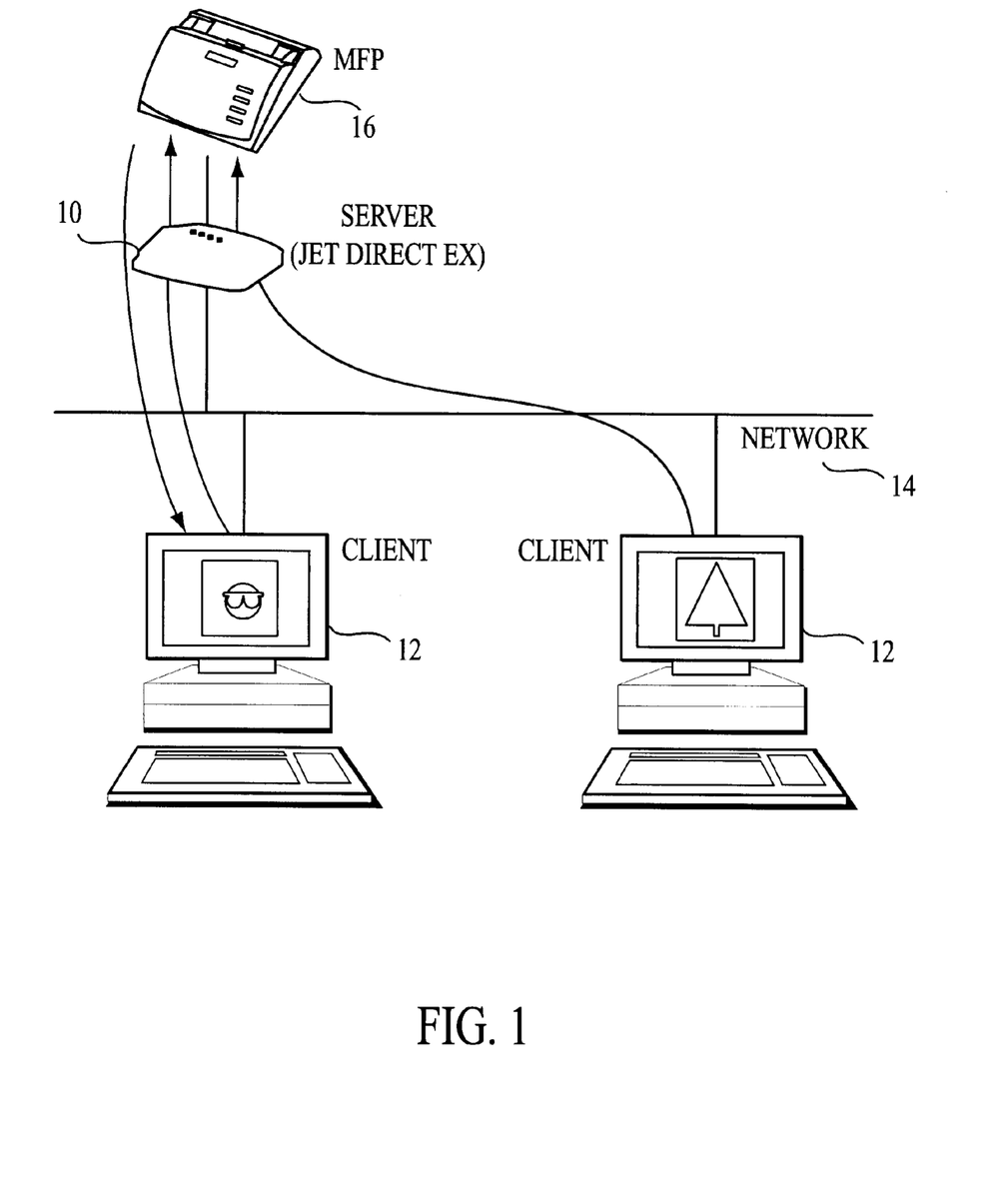
FIG. 1 is an overview of network system in which the present method is preferably applied.

Turning now to the drawings, and particularly FIG. 1, the JAVA® applet is stored in persistent memory of a network peripheral server 10 such as a Hewlett-Packard JETDIRECT EX box. The JETDIRECT EX box is shown and described in a Hewlett-Packard user manual part no. 5967-2290, and is incorporated by reference herein. It should be understood, however, that the functions of the server 10 can be performed, for example, as part of a card that connects via a bus interface to the peripheral, or as part of an internal central processing unit (CPU) of the peripheral 16. The JAVA® applet is supplied to a client 12 when needed, thus the user or a system manager does not need to install new software onto each client 12 to perform, for example, network scans. The server 10 connects a network 14 to a peripheral 16 like a printer or a scanner. The standard functionalities of a JETDIRECT server to which the present method is preferably applied are preserved. Thus, a server of the invention may be part of a JETDIRECT or similar device which also serves as a network print server. As is known in the art, JETDIRECT print servers connect to a network port through a network interface unit and permit clients to use one or more print peripherals connected to the JETDIRECT server.

The general functionality of the preferred method for an interactive client-server network scan using a web browser is illustrated in FIGS. 2A–2D. Initially, the client 12 connects to the server 10 when the user enters a universal resource locator (URL) identifying the address of the server 10 into a web browser to open a hypertext transfer protocol (HTTP) connection to the server 10, or otherwise instructs the client's 12 browser to connect to the server 10 (block 18). A connection is established between the client browser and server 10 (block 19), and a scan management applet is sent from the server 10 to the client 12 (block 20). The applet runs on the Java Virtual Machine of the web browser to connect the web browser to the server 10 and provide a suitable interface for scan interaction by a user on the client side. A preferred initial interface is shown in FIG. 3, and is created by the applet.

The present method provides for the case where a single server connects multiple scan peripherals, preferably MFPs, to the network through a single network port. The management applets accordingly obtain configuration information such as the number of ports existing on the server 10, names of the peripheral or peripherals 16 connected to the server 10, and capabilities of the connected peripherals 16. Where multiple peripherals are connected, a user may use the home page of FIG. 3 to select a desired peripheral (block 22).

To obtain peripheral configuration information, the management applet requires information from the peripheral 16. One way for the server to obtain this information is from the device ID string that is part of the IEEE 1284 protocol. The device ID string is a text string describing the device and its capabilities. When the server 10 is started or a peripheral 16 is connected to the server 10, scan program gateway software on the server 10 queries the peripheral 16 and retrieves the device ID string. Subsequently, the server 10 parses the device ID string and determines whether the peripheral 16 supports the scan function and the language used to communicate with the scanner. The server 10 looks for specific device names, for example Hewlett-Packard OFFICEJET PRO® 1150 or OFFICEJET PRO® 1170C SERIES, and observes a command codes field for scan languages, like Scanner Control Language (SCL) and multifunction peripheral 16 data transfer format (WPDTF), an example of which is MFPDTF1 (version 1).

The applet retrieves the same device ID string from the server 10 when the applet is started on the client 12 via a simple network management protocol (SNMP) query. The SNMP is a protocol that communicates using management information base (MIB) object values and typically is used to configure and manage network devices. While the present invention uses the SNMP protocol, it is contemplated that other protocols embracing the same characteristics as the SNMP protocol can be used. Thus, the applet can recognize and command several different scan devices if the server 10 supports those devices. The applet will create the client web (FIG. 3) interface to indicate only those devices that are supported.

Figure 3:
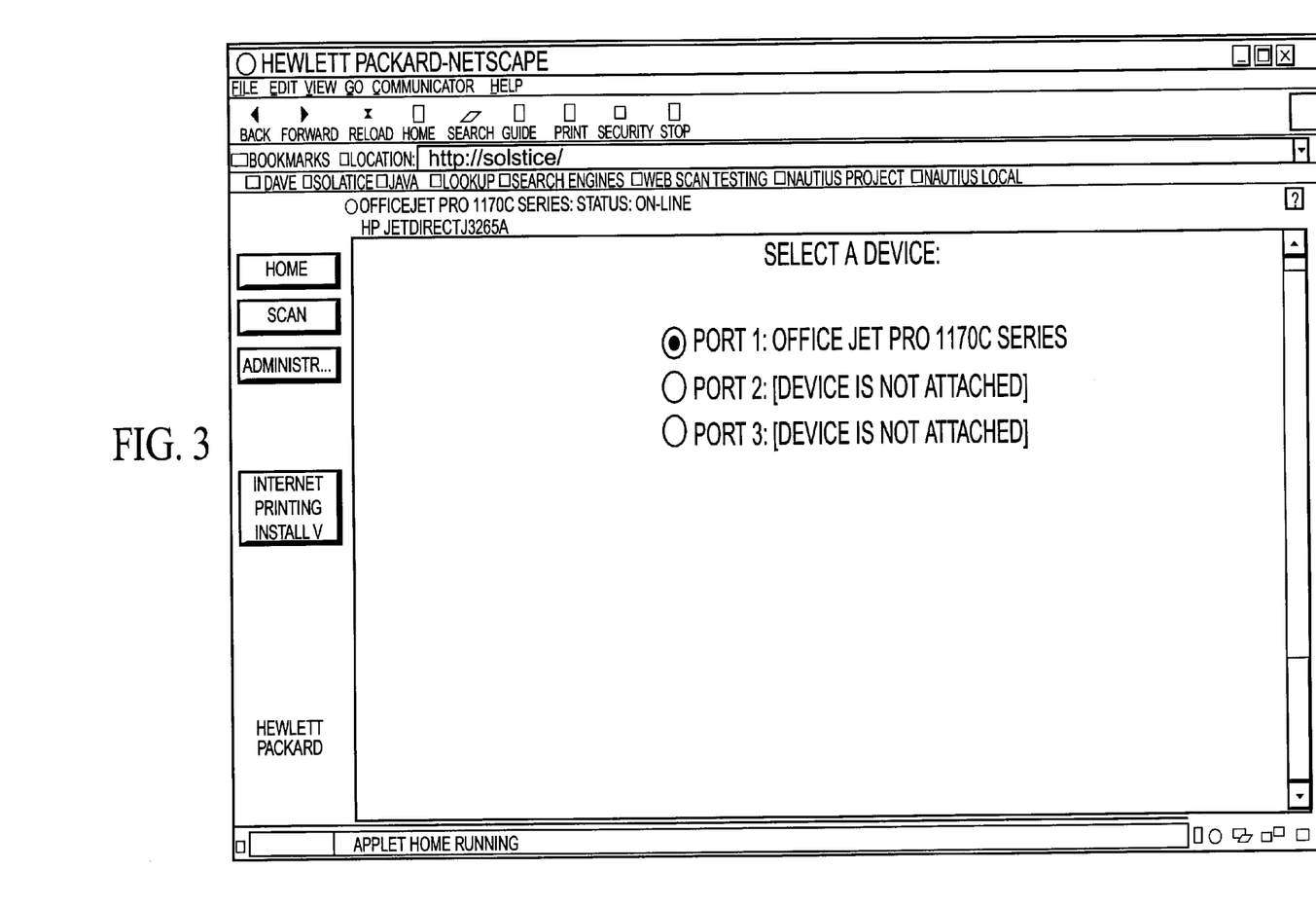
FIG. 3 is a preferred web Scan home page.
Figure 4:
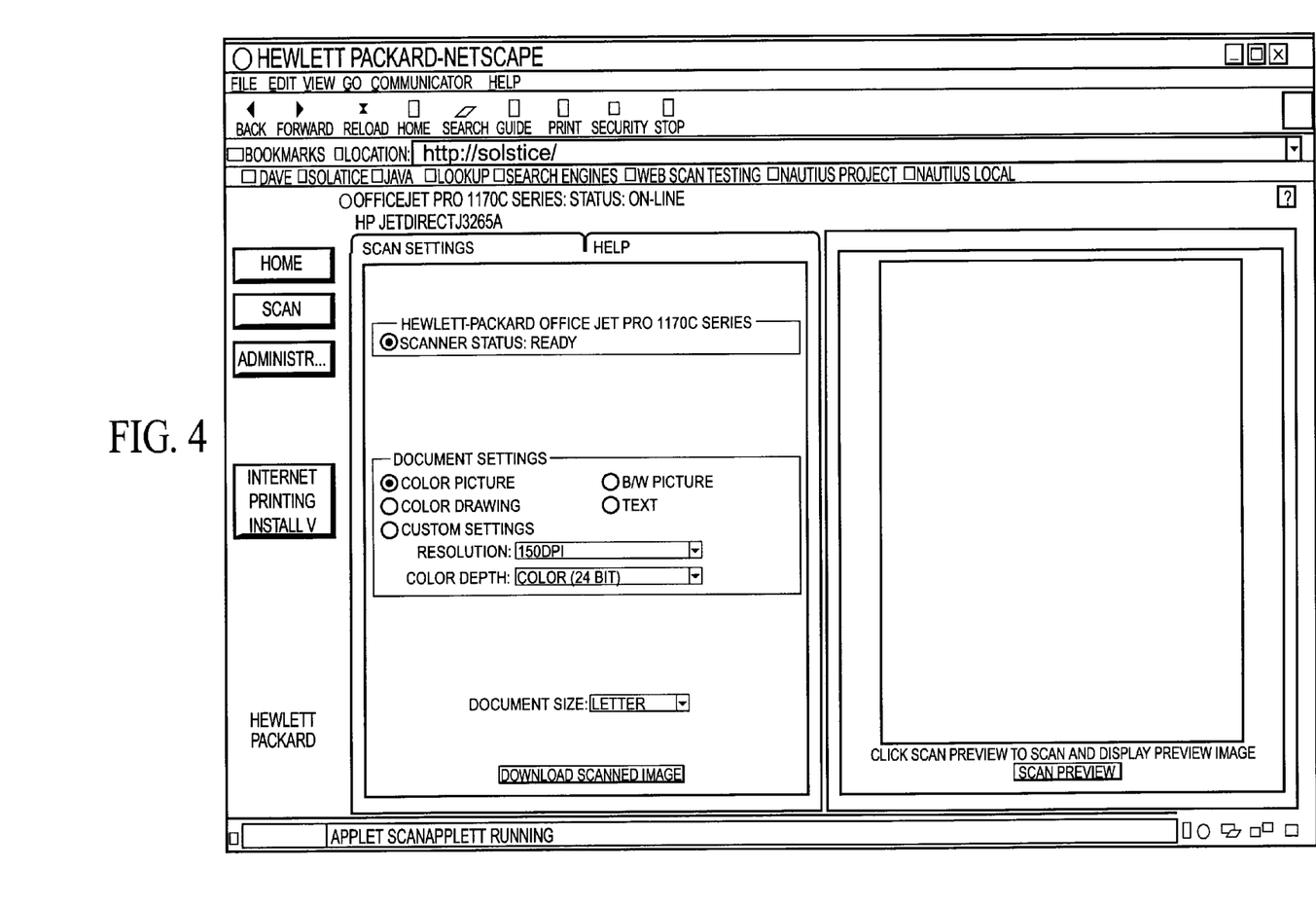
FIG. 4 is a preferred web Scan user interface page.

After selection of a peripheral through the FIG. 3 home page interface, if such option is available from the server, the user may access a scan page, through the home page of FIG. 3, by clicking, for example, a "SCAN" button on the client interface produced by the applet (block 24). A web Scan user interface page, shown in FIG. 4, is returned to the web browser from the server 10 upon selection of "SCAN". The web browser then downloads scan applets from persistent memory on the server 10 (block 26) to enable communications with the server for the various user options and displays presented in the FIG. 4 scan interface. This launches separate status threads and scan threads, which individually enable client-server interaction for the web browser for respective peripheral status communications and scan service communications.

The periodically updated result of the status thread is preferably presented on the client browser interface as an indication such as "scanner status: ready", "scanner status: offline", "scanner status: in use", etc. The client and server cooperate to produce the periodic indication as a parallel operation with any scan operations after a client 12 has selected a peripheral. The client queries the status and the server replies (block 28). The browser then displays the status (block 30). A predetermined length pause is made (block 32) before the browser again queries the status of the peripheral via a request to the server 10 (block 28). The peripheral 16 will return data to the server 10 to indicate that it is not available if, for example, a lid of the peripheral 16 is open or a user is making a copy with the peripheral 16. Other options on the FIG. 4 screen are also available to the user, including modification of parameters, while the status display runs cooperatively between the server 10 and the client 12.

Upon launch of the scan thread, the applet determines the capabilities of the peripheral 16 using the device ID string retrieved from the server 10. The applet determines whether the peripheral 16 supports a preview (block 34), i.e., utilizes a flatbed scanner, and if it does, the "preview" button on the scan page client interface (FIG. 4) is enabled so the user can select to preview the image being scanned (block 36). Since an image placed on a flatbed scanner remains stationary while it is being scanned, a flatbed scanner can support preview by repeatedly scanning the image multiple times. The applet subsequently determines other capabilities of the peripheral from the device ID string, such as the supported scan resolution, color depth, and paper size. The applet makes corresponding adjustments to the user interface of FIG. 4 so the user interface complies with the supported capabilities of the peripheral. This completes server-client interactions through the applet relating to presentation of the dynamic user interface of FIG. 4 to a user at the client 12, and the applet then waits for scan actions to be entered through the interface (step 38).

Preferred possible actions include scan download, preview download (if available) and scan parameter alteration, selections of which are made through the FIG. 4 interface and result in the management applet in the client 12 launching threads to accomplish each available function (block 40). Parameter changes are stored by the applet for use in scanjobs (block 42). Preferably, parameters include paper size, resolution in dots per inch (dpi), an image type, (i.e., color picture, color drawing, etc.), color depth, (i.e. color, black and white, or greyscale), and an image format, like TIFF, and similar parameters. If the user does not modify scan parameters, default settings are stored; for example, a paper size of 8½×11 inches, a resolution in dpi set to 300, a color depth of color, and the image format is set to TIFF. A preview may be launched, if available. Finally, selection of a "download scanned image" button results in the applet in the client 12 initiating a scan job (block 44). The latter two operations result in respective download scan, FIG. 2B, and preview, FIG. 2C, threads being launched by the applet. In each case after launching one of these actions, the client 12 continues to wait for additional action while the threads are executing (block 38). As mentioned above, the status client-server interaction loop (blocks 28–32) also continues to run.

Figure 2A:
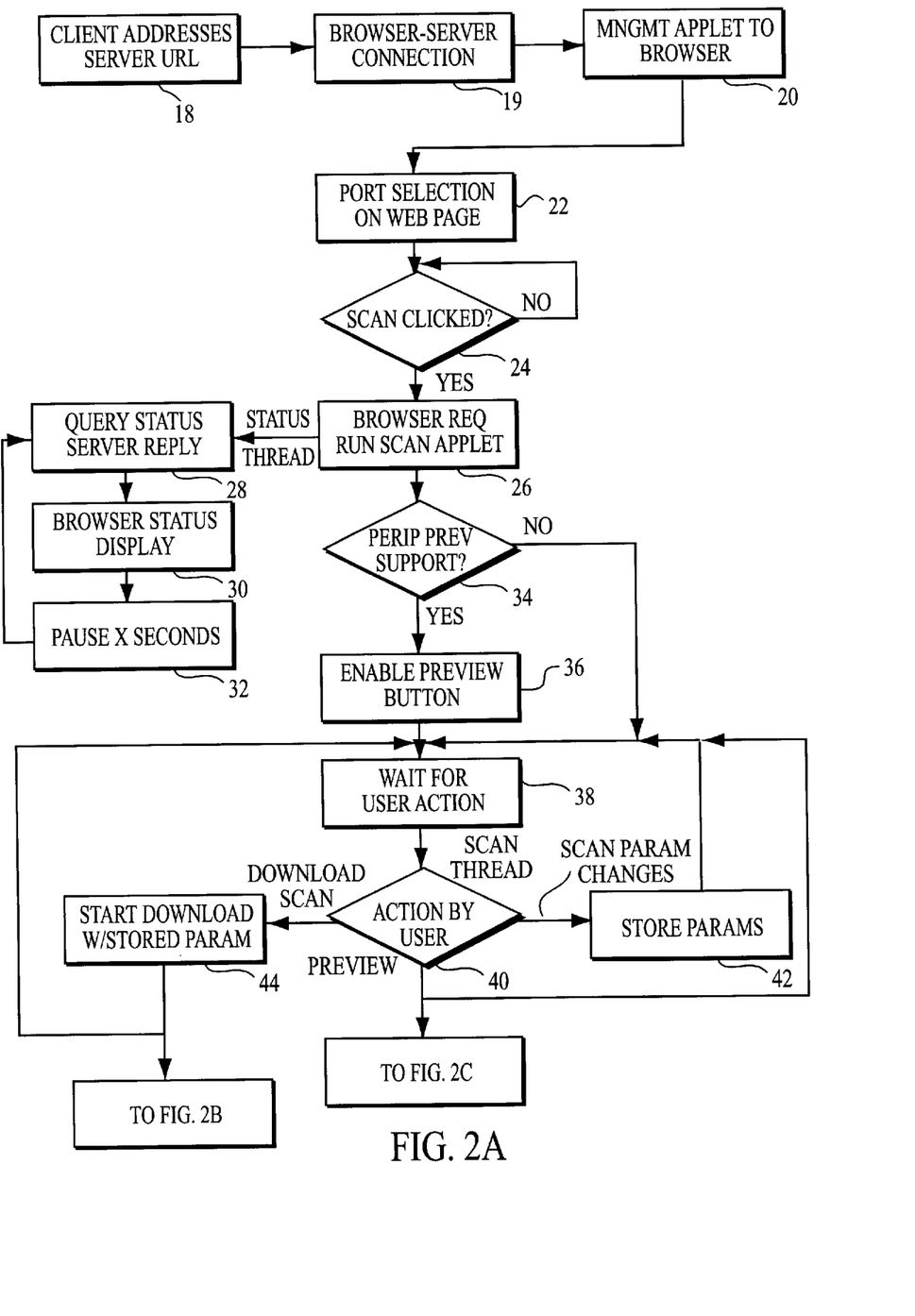
FIGS. 2A–2D are flow charts illustrating functions of the networked scan server method of the present invention.
Figure 2B:
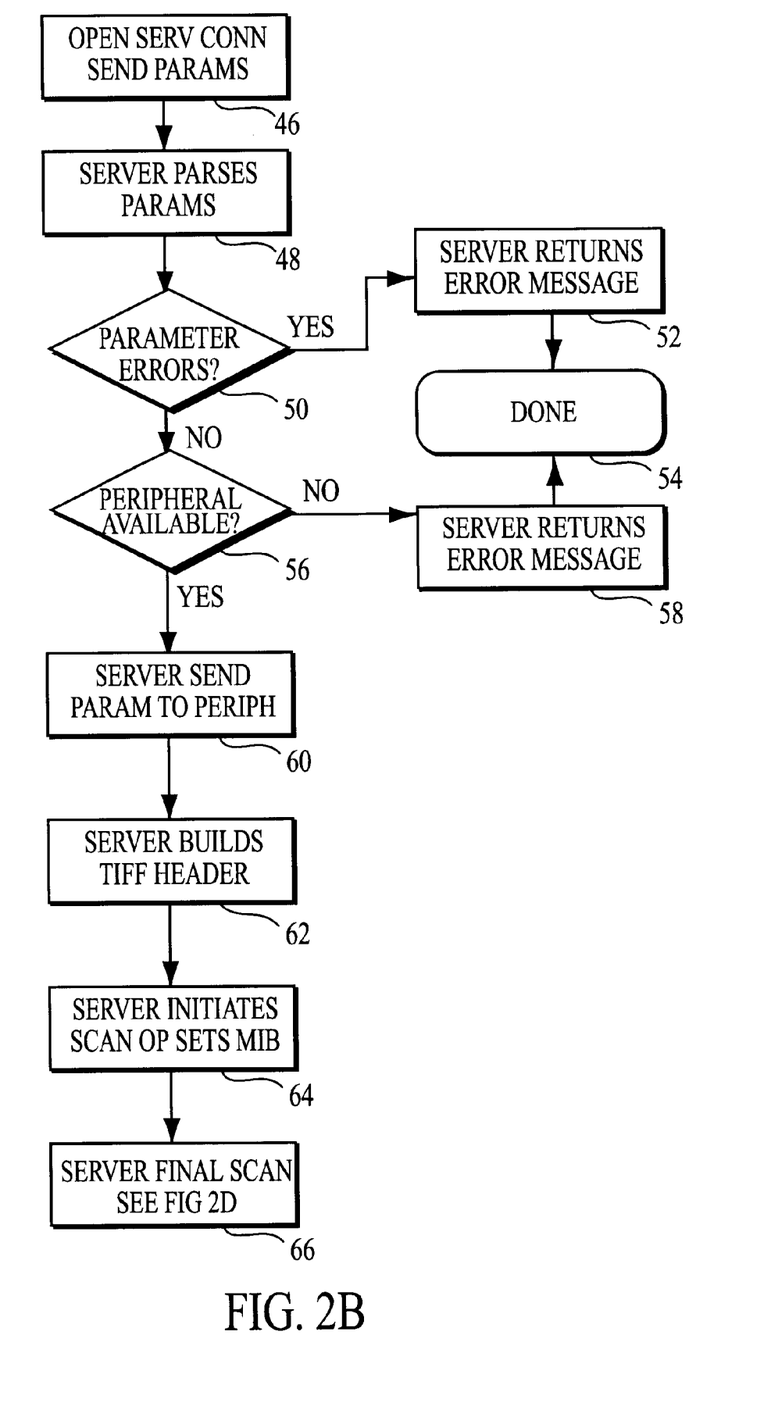

Upon download scan selection, as seen in FIG. 2B, the client 12 opens a server connection and communicates a scan job to the server 10 including the stored parameters (block 46). The server 10 parses, or extracts, the scan parameters, like image type, image format, paper size, and resolution in dpi, one-by-one from a string of the parameters (block 48). If the user has not designated a required parameter, the server 10 fills in default parameters for a particular peripheral 16. Next, the server 10 checks an internal table to determine if the parameter is outside the scope of acceptable parameters for the particular peripheral 16 (block 50). The server 10 determines the type of peripheral 16 by the device ID string of the peripheral 16. Thus, if the peripheral 16 does not support a particular paper size, for example, the server 10 will return an error message to the client 12 (block 52) and terminate the download connection (block 54). Any further actions are initiated through the waiting for user input (block 38), which had continued in the client 12 upon launching to the download scan thread.

After setting the parameters, the user presses or clicks a "DOWNLOAD SCANNED IMAGE" button. For security reasons, namely to avoid information entering from the web and erasing a PC's hard drive, JAVA® applets can only access resources within their "JAVA® sandbox." In the present invention, the "JAVA® sandbox" is defined by random access memory (RAM) on the PC and network connections back to the server 10. Since the applet in the client does not communicate directly with the scanner and the PC's hard drive, the applet invokes the web browser to download the scanned image (block 60) to achieve image storage on the client's hard drive. To download the scanned image, the JAVA® Scan Applet causes the browser to open a connection on a scan port and issue an HTTP request to start a scan. The web scan program in the server 10 serves the image up in a format the browser recognizes, such as TIFF. The browser will treat this like any file download and prompt a user to save the server formatted, e.g., TIFF, file to disk, or display it, for example, using an image processing application. Once a user selects a hard drive destination, the scan program in the server 10 streams scanned image data to the browser which then directs it to disk. It is contemplated, however, that scanned images can be directly loaded to a hard drive or computer application if applets obtain an adequate level of permission to access local resources.

If there were no parameter errors, the server 10 next checks to see if the peripheral requested by the client scan job is available (block 56). If it is not available, an error message is returned (block 58) and the thread terminates (block 54). The availability check is necessary here since a user may select to download despite an unavailable status indication in the client user interface. If the peripheral is available, the server 10 continues running its scan thread. Parameters are sent to the peripheral (block 60), and the server uses the parameters to build a TIFF header (block 62), assuming that a TIFF file format has been requested in the scan job sent by the client 12. Other server supported formats may be similarly handled by the server scan program. A scan operation is then initiated by the server scan program, which sets a MIB to ACTIVE (block 64) and launches a final scan thread (block 66). In building the TIFF header, the server 10 receives a response for each parameter from the peripheral 16 and uses the responses to form the header permitting a TIFF image that software on the user's PC can display. The TIFF format consists of a TIFF header followed by a TIFF image file directory (IFD), all followed by data for the actual image. The server 10 returns the TIFF header to the client scan applet and issues the command to the peripheral 16 to begin a scan (block 66). Setting of the MIB object to ACTIVE (block 64) informs other clients that the scanner is busy.

Figure 2C:
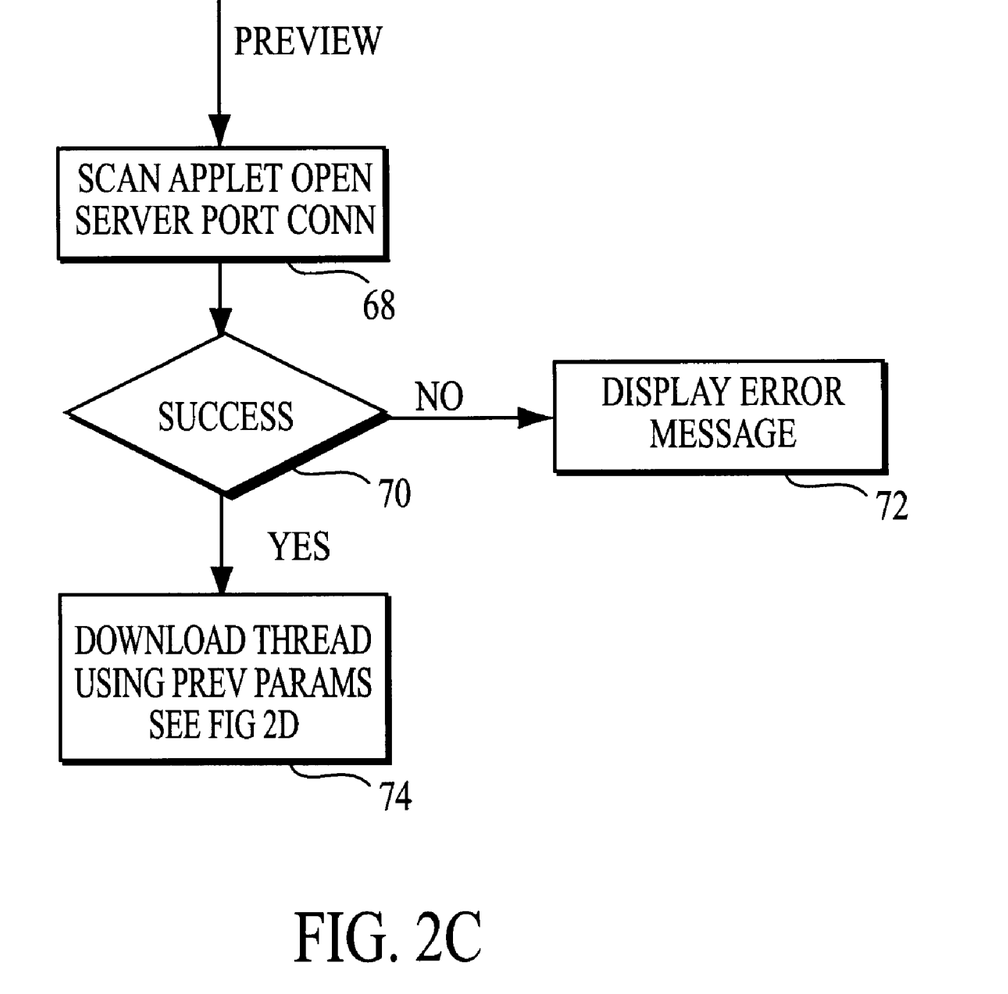
Figure 5:
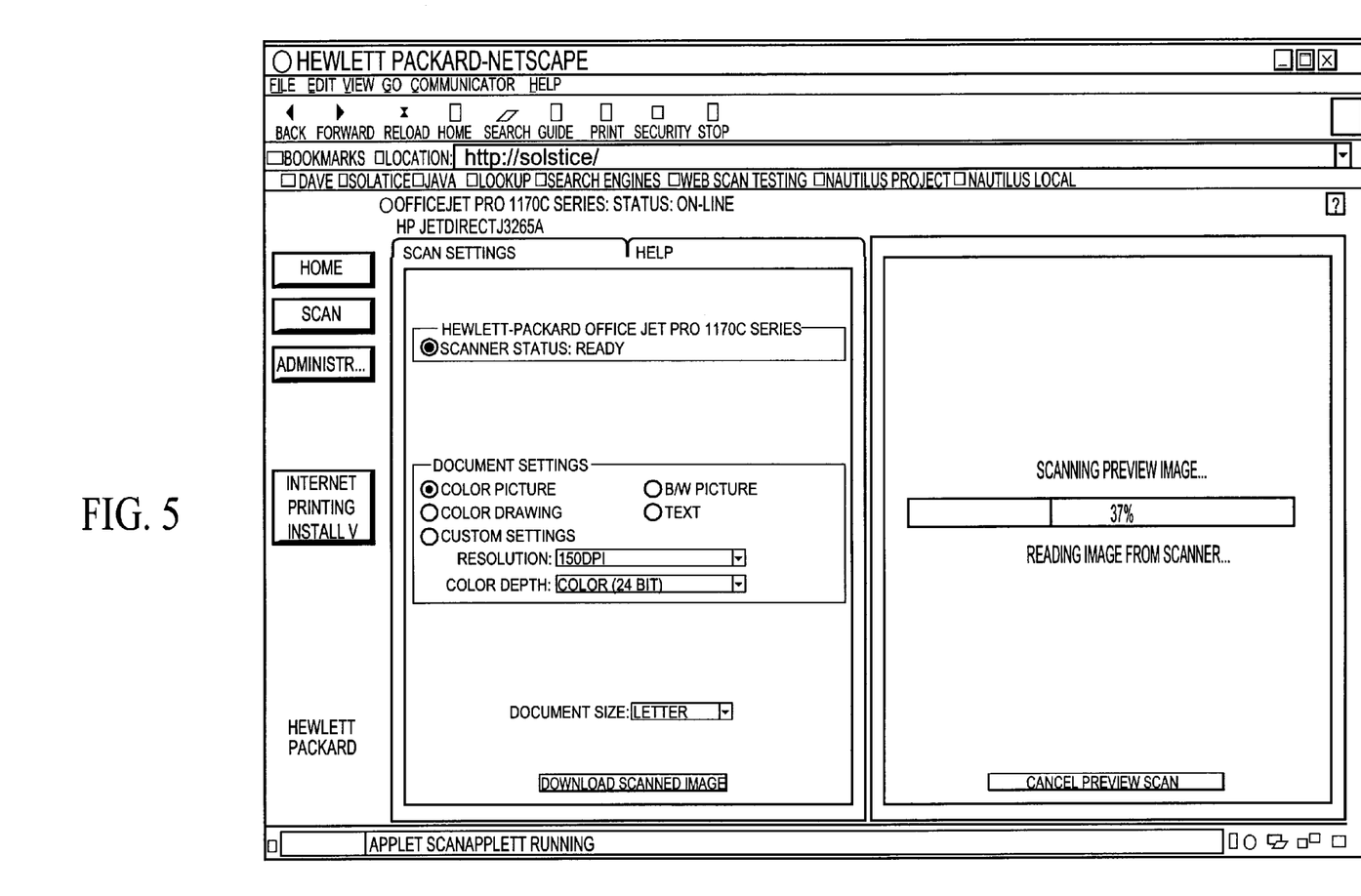
FIG. 5 is a preferred web Scan user interface page with a preview progress bar.

To preview the image, the user presses or clicks a "PREVIEW" button displayed on the client's scan interface. If the user clicks the "PREVIEW" button, the scan applet in the client launches a preview thread which opens a connection on the scan port of the server 10 (block 68). The success, such as availability of the peripheral, is checked (block 70), and failure results in an error message and the termination of the preview thread (block 72). A failure might also result if the scanner is unable to implement a preview function. Otherwise, the server scan program is initiated with preview parameters being sent to the peripheral and the final scan thread being launched (block 74). The preview scan parameters are preferably kept by the server, and are preferably low resolution, i.e. low dpi, parameters. The display of the preview image in the user interface allows selection of a portion of an image for a final scan, to enable, for example, image cropping and other operations during the final scan. These are carried out through parameter alteration, or by graphically selecting a portion of the preview image, information about which is sent to the server when a final scan thread is launched based upon a selection of a portion of a preview image. The preview thread also monitors the progress of the image download, as shown in FIG. 5, where a preview progress bar is displayed for a user as the server conducts the preview scan and the client scan applet updates the display. The applet divides the data sent to the client 12 by the content length of the scanned image to provide data necessary to update the progress bar. The preview button changes to "cancel preview" to allow the preview to be canceled before the job is complete.

Before an image is scanned, the server 10 returns a content length of the scanned image plus one byte to the scan applet in the client 12. The extra one byte is added to the content length so that the server 10 scan program can control the closing of the connection to the scanner before the web browser has a chance to close the connection. Subsequently, the server 10 receives data from the scanner and sends the data to the applet in the client 12. As shown in FIG. 5, the scan applet in the client updates the progress bar as it receives data.

Figure 2D:
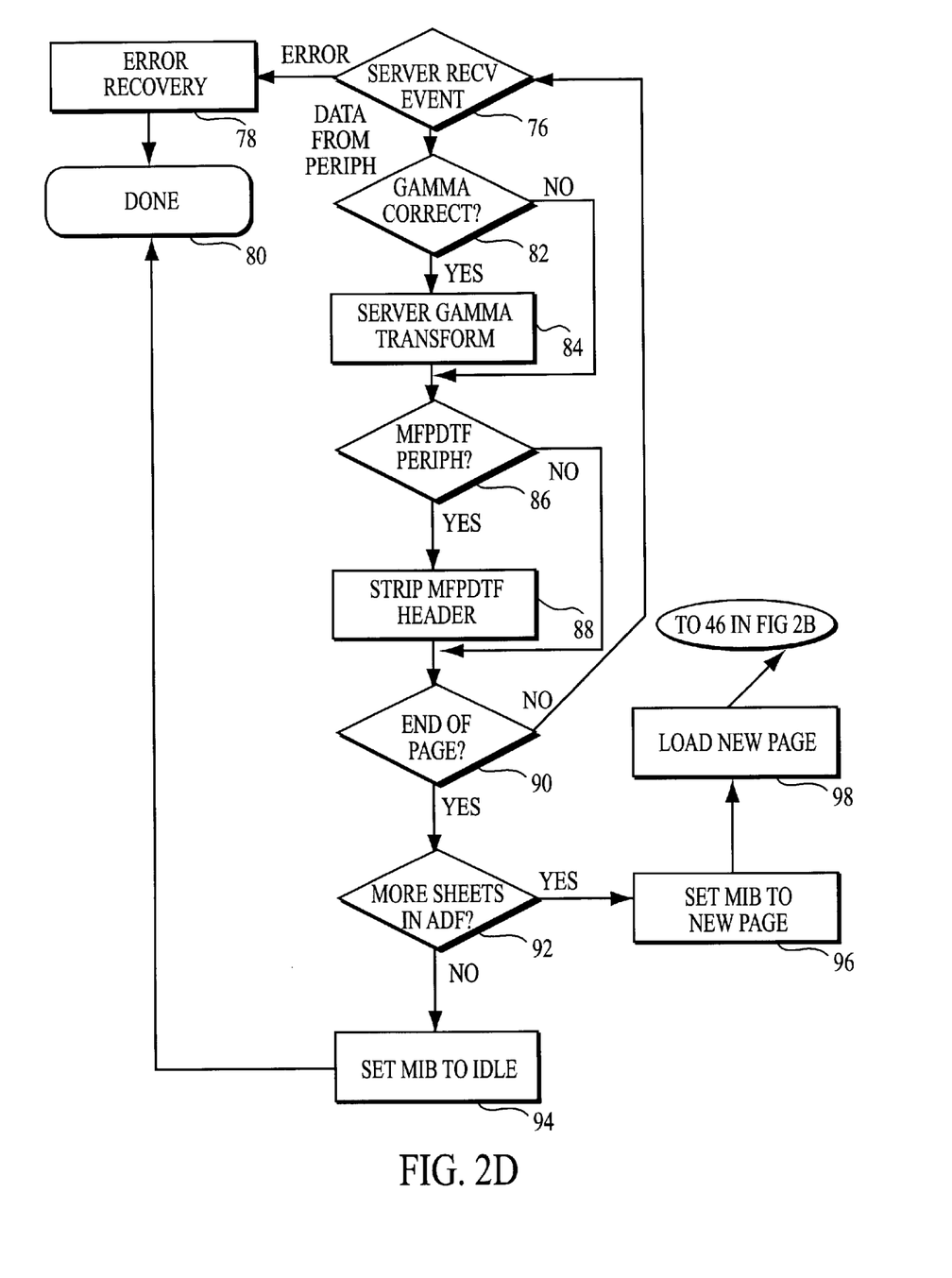

Whether launched by the preview or download scan threads, the final scan thread functions executed by the server scan program are the same with only the parameters used being different. Referring to FIG. 2D, the server receives an event (block 76) in the form of a communication from the peripheral after commencing execution of a scan job. This may be an error, in which an error recovery algorithm is executed (block 76) and the final scan thread finishes (block 80). A preferred error recovery technique is disclosed in commonly owned co-pending application to Scoville et al. filed concurrently herewith and entitled Network Scan Server Ready State Recovery Method. That application is incorporated by reference herein. If data is received, the server checks (block 82) to see if the client scan job request has disabled the gamma correction which is preferably performed by default through the server scan program as data is received and sent on to the client. It is preferred that the server 10 gamma correct the color scan data before sending the data to the client 12. Thus, absent its disablement, gamma correction (block 84) is utilized to improve scanned image quality, the corrected images being necessary due to a nonlinear perception of the human eye. While a pixel value can have a value of 0 to 255 for example, where 0 is black and 255 is white, and the values in between contain a varying intensity. Thus, a nongamma corrected image will appear too dark to the human eye. Gamma correction modifies the intensity of pixels displayed by changing the value of the pixel returned by the scanner according to the following function:

INTENSITY $= X^{(GAMMA)}$

Where x is a voltage (0<X<1).

GAMMA=1 for a nongamma corrected image and the intensity of the pixel displayed is the voltage used to display the pixel. It has been found that a GAMMA value of approximately 2.2 gives the viewer the best image. The server 10 uses a preferred table lookup, shown in FIG. 6, to mimic the voltage changes for GAMMA=2.2 and change each pixel value returned by the scanner, but other methods of making the voltage changes are contemplated. Hence, a value 0 is mapped to 0, 1 is mapped to 6, 2 is mapped to 12, etc.

Figure 7:
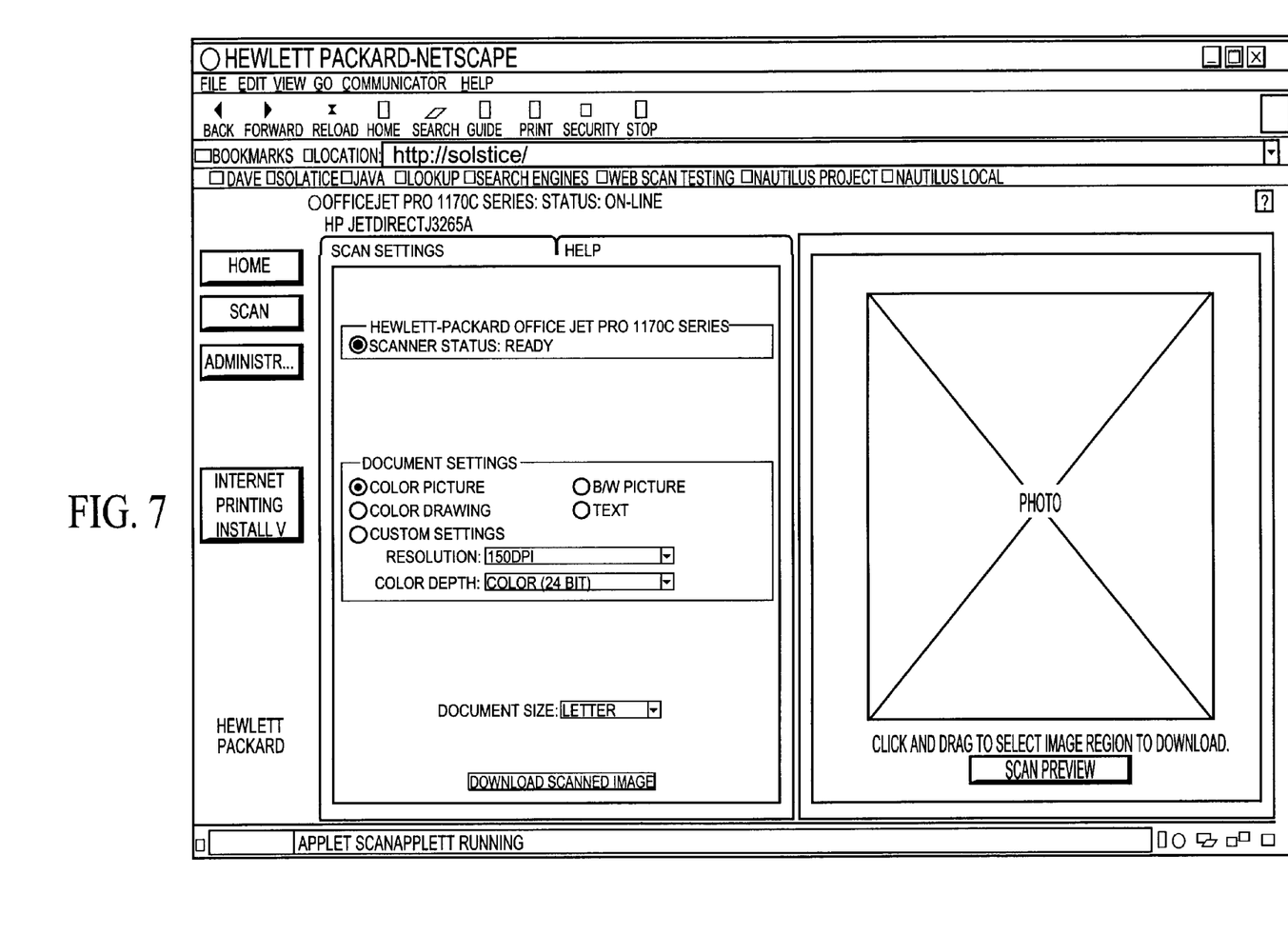
FIG. 7 is a preferred web Scan user interface page showing a preview scanned image available for scan editing.

The server also determines if the peripheral uses an MFPDTF format (block 86), and if it does the scan program in the server further strips MFPDTF header information so that it may build the TIFF format as discussed above, and send gamma corrected, TIFF format image data to the client 12. MFPDTF contains scan information such as the start of a page and an end of the page, followed by actual scan data. The stripping is also conducted to enable other formats which may be requested by a client and constructed by the server scan program as it passes image data on to the client. If a page has not been completed (block 90), the server scan program continues receiving data from the peripheral, performing the aforementioned steps, and sending it to the client 12. If the page had ended, and the peripheral has a document feeder, the server 10 checks for more sheets in the automatic document feeder (ADF) (block 92). The server 10 closes the scan connection to the client 12 and sets the MIB to idle, allowing use of the peripheral by other clients. This completes the final scan thread (block 80). If there is an additional sheet in an ADF capable peripheral being used by the scan job, then the MIB is set to a new page (step 96), a new client server connection is established, the server 10 has a new page loaded or the peripheral handles the page loading (some peripherals, like those using MFPDTF will automatically load the new page)(block 98), and the data transfer from the server to the peripheral continues (block 76). As shown in FIG. 7, after the scan operation is completed for a preview, the preview image is displayed with the web Scan user interface by the client scan applet. Final scan data is stored, and may be displayed with a suitable application.

In transferring data to the client during the final scan thread, the server 10 returns the TIFF header to the web browser, and the web browser prompts the user to either save the TIFF image to a file or open the TIFF image. The server 10 returns a content length of the scanned image plus one byte to the web browser which the web browser can use in conjunction with actual scan data received to update its status bar. The extra byte permits the server 10 to control close of a scan channel to the peripheral.

Also, the server 10 pads or truncates the scanned image data as required. For sheet feed scanners, it is impossible to know in advance the size of a piece of paper being inserted into the scanner. Additionally, a mechanism that pulls the paper through is mechanical, thus the paper may be shifted in the scanner which causes fluctuations in the amount of data that the scanner returns. However, the amount of data, measured in bytes, which the server 10 expects the scanner to return is known since the user was prompted to supply a page size as a scan parameter. The page size parameter is located in an image file directory (IFD) located after the TIFF header. If the number of bytes received by the server 10 is less than expected, then the scanned image is padded by generating white image data to an end of the existing data. Conversely, if the scanner sends more bytes than expected, the extraneous data is disregarded. In both cases, the server 10 sends the correct amount of data over the network.

If multiple users connect to the server 10, to prevent pages of a multi-page job of one user from mixing with scanning images of a job of another user, the scan applet assigns a random scan identification number, for example 1 to 1000, before initiating each scan. The scan applet maintains the scan identification number for the life of the scan session. The scan identification number is passed as a scan parameter to the server 10 for each scan command. Between multi-page scan pages, the server 10 will only accept connections from the user with the same scan identification.

From the foregoing description, it should be understood that an improved server 10 has been shown and described which has many desirable attributes and advantages. The present invention provides an interactive client-server network scan capability available to any client having browser with the requisite general purpose software program capability, such as a Java Virtual Machine that is a common feature of many web browsers. The interactive nature of the client-server scan provides for enhanced features through the client interface without the requirement for installation of special purpose client scan server software on the client machine. Status updates provided from server to client, preview capabilities, progress updates, image portion selection, and contention resolution are preferred features enabled through the interactive scan control and display interface provided by the invention.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A method for operating a scan peripheral in a network including at least one client having a general purpose software capability in a web user interface application and a server connected to the scan peripheral, the method comprising the steps of:
   initiating, by the client, a universal resource locator scan request;
   responding, by the server, to said client universal resource locator addressed request by forwarding to the client a general purpose format software program for creating and running a scan web page;
   accepting, by the server, a scan job from the client;
   implementing, by the server, a scan job program to control a scan peripheral; and
   communicating between the server and the client through the general purpose software program to initiate actions of the scan job program which control the scan peripheral and provide user displays through the client.

2. The method according to claim 1 wherein said communicating comprises a step of dynamically sending scan peripheral status updates from the server to the client.

3. The method according to claim 2 wherein said client displays the scan peripheral status updates upon receiving them from the server.

4. The method according to claim 1 wherein the general purpose format software program is a Java applet for execution on a Java Virtual Machine in the web user interface application.

5. The method according to claim 4 wherein the scan job program obtains a device ID string identifying an appropriate scan language from a peripheral to which the scan job is addressed and selects the appropriate scan language to communicate with the peripheral.

6. The method according to claim 1 wherein the scan job program in the server controls closing of a scan channel to the peripheral upon completion of a scan job.

7. The method according to claim 6 wherein the general purpose software program sets a random scan ID upon implementing the scan job program and sends it to the server and the scan job program prevents accepting of scan jobs from other clients until the scan job associated with the scan ID finishes.

8. The method according to claim 1 wherein said step of accepting a scan job includes accepting client scan parameters from the general purpose software program of client.

9. The method according to claim 8 further comprising a step of checking, by the server, the validity of the client scan parameters.

10. The method according to claim 9 further comprising a step of setting, by the server, default scan parameters to replace any missing scan parameters found in said step of checking.

11. The method according to claim 9 further comprising a step of notifying by the server, the client of any invalid scan parameters.

12. The method according to claim 1 wherein said step of accepting a scan job includes a step of checking for a preview command and, if a preview command is detected, said step of implementing implements preview control of the scan peripheral and then said step of accepting a scan job is repeated.

13. The method according to claim 12 further comprising a step of providing scan progress information from the server to the client.

14. The method according to claim 12 wherein the scan job program implements a low resolution scan to implement preview control of the scan peripheral.

15. The method according to claim 14 wherein the scan job program implements a partial field scan from a selected portion of a previous low resolution scan when said step of accepting as scan job is repeated after a preview control of the scan peripheral.

16. The method according to claim 1 wherein said communicating step includes transferring image data from the server to the client, said method further comprising a step of gamma correcting image data prior to transmitting it from the server to the client.

17. The method according to claim 1 wherein said communicating step includes transferring image data from the server to the client, said method further comprising a step of adjusting the size of image data prior to transmitting it from the server to the client.

18. The method according to claim 1 wherein said communicating step includes transferring image data from the server to the client, said method further comprising a step of converting image data prior to transmitting it from the server to the client.

19. The method according to claim 18 wherein said step of converting comprises stripping status information from multifunction peripheral data transfer format image data and adding a tagged image file format header and image file directory.

20. A method for operating a scan peripheral in a network including at least one client having a general purpose software capability in a web user interface application and a server connected to the scan peripheral, the method comprising the steps of:

initiating, by the client, a universal resource locator scan request;

responding, by the server, to said client universal resource locator addressed request by forwarding to the client a general purpose format software program for creating and running a scan web page;

accepting, by the server, a scan job from the client;

implementing, by the server, a scan job program to control a scan peripheral;

communicating between the server and the client through the general purpose software program to initiate actions of the scan job program which control the scan peripheral, including transmitting image data from the server to the client and provide user displays through the client, adjusting the size of image data prior to transmitting it from the server to the clintient;

inserting a tagged image file format header into the image data prior to transmitting it from the serve r to the client;

inserting, by the server, an image file directory including an image length se t by the scan job;

padding, by the server, the image data if the actual length of image data from a completed scan job is less than the length set by the scan job;

truncating, by the server, the image data if the actual length of image data from a completed scan job is greater than the length set by the scan job.

21. A method for operating a scan peripheral in a network including at least one client having a general purpose software capability in a web user interface application and a server connected to the scan peripheral, the method comprising the steps of:

initiating, by the client, a universal resource locator scan request;

responding, by the server, to said client universal resource locator addressed request by forwarding to the client a general purpose format software program for creating and running a scan web page;

accepting, by the server, a scan job from the client;

implementing, by the server, a scan job program to control a scan peripheral;

communicating between the server and the client through the general purpose software program to initiate actions of the scan job program which control the scan peripheral and provide user displays through the client polling the scan peripheral, prior to said step of accepting, to determine availability status of the scan peripheral;

notifying the client of the availability of the scan peripheral; and repeating said polling and notifying steps while continuing with said step of accepting.

22. A server for operating a scan peripheral in a network having at least one client with a general purpose software capability in a web user interface application, the server being connected to the scan peripheral via the network, the server comprising:

means for responding to a client generated universal resource locator addressed request and forwarding to the client a general purpose format software program for creating and running a scan web page that can be displayed by the client;

means for accepting a scan job requested by the client using said general purpose format software program;

means for implementing a scan job program to control the scan peripheral; and, means for communicating with the client through the general purpose software program to initiate actions of the scan job program which control the scan peripheral and provide data that enables the client to generate user displays relating to the operation of the scan peripheral.

* * * * *